United States Patent
Schuster et al.

(10) Patent No.: US 8,804,384 B2
(45) Date of Patent: Aug. 12, 2014

(54) CONVERTER FOR POWERING ELECTRIC MOTOR

(75) Inventors: Thomas Schuster, Ottenbach (DE); Harald Wolf, Ubstadt-Weiher (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 616 days.

(21) Appl. No.: 10/584,337

(22) PCT Filed: Nov. 23, 2004

(86) PCT No.: PCT/EP2004/013261
§ 371 (c)(1),
(2), (4) Date: Jun. 23, 2006

(87) PCT Pub. No.: WO2005/067128
PCT Pub. Date: Jul. 21, 2005

(65) Prior Publication Data
US 2007/0066155 A1    Mar. 22, 2007

(30) Foreign Application Priority Data
Dec. 23, 2003 (DE) .................................. 103 61 430

(51) Int. Cl.
*H02H 7/122* (2006.01)
*H02M 7/537* (2006.01)
(52) U.S. Cl.
USPC .............................................. 363/55; 363/131
(58) Field of Classification Search
USPC ................... 363/55, 56.02, 56.03, 131, 132
See application file for complete search history.

(56) References Cited

U.S. PATENT DOCUMENTS

| | | | | |
|---|---|---|---|---|
| 3,714,470 A | * | 1/1973 | Goldberg | 327/175 |
| 3,922,606 A | * | 11/1975 | Nordling | 375/249 |
| 4,514,690 A | * | 4/1985 | Miller et al. | 324/225 |
| 4,797,635 A | * | 1/1989 | Hatcher | 331/17 |
| 4,958,269 A | * | 9/1990 | Gritter | 700/33 |
| 5,355,136 A | * | 10/1994 | Katagiri | 341/157 |
| 5,973,553 A | * | 10/1999 | Kim | 327/551 |
| 6,078,203 A | | 6/2000 | Zafarana et al. | |
| 6,194,864 B1 | * | 2/2001 | Kinpara et al. | 318/805 |
| 6,356,048 B1 | * | 3/2002 | Zenoni et al. | 318/806 |
| 6,559,735 B1 | * | 5/2003 | Hoang et al. | 333/134 |

(Continued)

FOREIGN PATENT DOCUMENTS

| | | |
|---|---|---|
| DE | 26 40 622 | 3/1977 |
| DE | 199 12 112 | 9/2000 |

(Continued)

OTHER PUBLICATIONS

Translation of International Preliminary Report on Patentability, Sep. 8, 2006, from PCT International Patent Application No. PCT/EP2004/013261, dated Feb. 23, 2005.
International Search Report, PCT International Patent Application No. PCT/EP2004/013261, dated Feb. 23, 2005.
Written Opinion of the International Searching Authority (w/English translation of Supplemental Sheets), PCT International Patent Application No. PCT/EP2004/013261, dated Feb. 23, 2005.

*Primary Examiner* — Adolf Berhane
*Assistant Examiner* — Emily P Pham
(74) *Attorney, Agent, or Firm* — Kenyon & Kenyon LLP

(57) ABSTRACT

A converter includes at least device(s) for sensing the currents fed to the electric motor powered by the converter, the device(s) for current detection being arranged inside the converter, and the signals of the device(s) being fed to a nonlinear filter, whose output signals are fed to an additional filter that is connected to an analog-to-digital converter.

7 Claims, 8 Drawing Sheets

(56) References Cited

U.S. PATENT DOCUMENTS

| | | |
|---|---|---|
| 6,592,412 B1 | 7/2003 | Geil et al. |
| 6,759,822 B2 * | 7/2004 | Marusarz ............ 318/268 |
| 6,760,237 B2 | 7/2004 | Tsuji et al. |
| 2004/0213100 A1 * | 10/2004 | Iwashiro ............ 369/44.32 |
| 2005/0002462 A1 * | 1/2005 | Ungerboeck ............ 375/259 |

FOREIGN PATENT DOCUMENTS

| | | |
|---|---|---|
| DE | 199 42 203 | 3/2001 |
| DE | 100 63 086 | 8/2001 |
| DE | 103 02 602 | 8/2003 |
| GB | 2 224 609 | 5/1990 |

\* cited by examiner

CONVERTER FOR POWERING ELECTRIC MOTOR

FIELD OF THE INVENTION

The present invention relates to a converter.

BACKGROUND INFORMATION

In the case of converters, it is conventional that the actual value I_actual of the motor current can be measured, the current-sensing device being situated in the converter. The signals provided by the current-sensing device of the control electronics are initially supplied to a filter 1, e.g., a PT1 filter, as shown in FIG. 1. Therefore, microcontroller 2 is provided with filtered measuring signals, and interference signals become suppressible. The PT1 filter may take the form of a low-pass filter having a time constant of, e.g., 20 µs.

In the case of these converters, it may be that when long cables are used between the converter and the powered electric motor, and the capacitance of the cable produces recharging-current peaks that are too high. This is because the converters are operated in a pulse-width-modulated manner, and a change in voltage at the output of the converter produces large, short-term, charging-current peaks of this cable capacitance.

SUMMARY

Example embodiments of the present invention may improve the current sensing in converters.

Features of the converter, include that it at least includes device(s) for measuring the currents supplied to the electric motor that is powered by the converter, the device(s) for current sensing being arranged inside the converter, and the signals of the device(s) being fed to a nonlinear filter, whose output signals are fed to an additional filter that is connected to an analog-to-digital converter.

It may be provided that a high control performance and control quality are attainable in converters, which are connected, in each instance, to the powered electric motor via long cable, for the recharging-current peaks produced due to the high cable capacitance may be effectively filtered away, e.g., at least one order of magnitude more than in the case of a mere PT1 filter. In this context, it may be provided that not only the peak value of the filtered signal is less, but that above all, the voltage-time area may be provided to be much less than in the case of a PT1 filter or other linear filters as well.

The nonlinear filter is arranged such that the changes in the value of the current, which are motor-dependent, i.e., determined by the arrangement of the electric motor, are transmitted substantially undisturbed. In contrast to this, recharging-current peaks of shorter duration than the characteristic time of the nonlinear filter are suppressed in the measuring signal. However, changes in current that are caused, for example, by mechanical load changes of the rotor of the electric motor are transmitted substantially unchanged.

The analog-to-digital converter may be integrated in a microcontroller or microprocessor. In this context, it may be provided that as few inexpensive components as possible are usable.

The nonlinear filter may be a run-up transmitter. In this context, it may be provided that a component is producible, which is particularly simple to construct.

The run-up transmitter may include a comparator and an integrator. This may provide that standard components may be utilized.

The additional filter may be a PT1 filter. This may provide that the circuitry of the related art only requires a few simple modifications.

The value corresponding to the rated current of the converter may be attainable for the run-up transmitter in a time between, e.g., 5 and 10 µs. This may provide that the filtering is highly effective and the voltage-time area is much less than in the case of using a PT1 filter having a corresponding time constant.

The PT1 filter may have a time constant having a value between, e.g., 15 and 25 µs, e.g., approximately 20 µs. This may provide that conventional components are usable.

LIST OF REFERENCE CHARACTERS 1 filter
2 microcontroller
3 run-up transmitter
31 comparator
32 integrator having a level converter
41 operational amplifier
42 operational amplifier
R1 resistor
R2 resistor
C1 capacitor
C2 capacitor Example embodiments of the present invention are explained in more detail below with reference to the appended Figures.

BRIEF DESCRIPTION OF THE DRAWINGS

Figure 1:
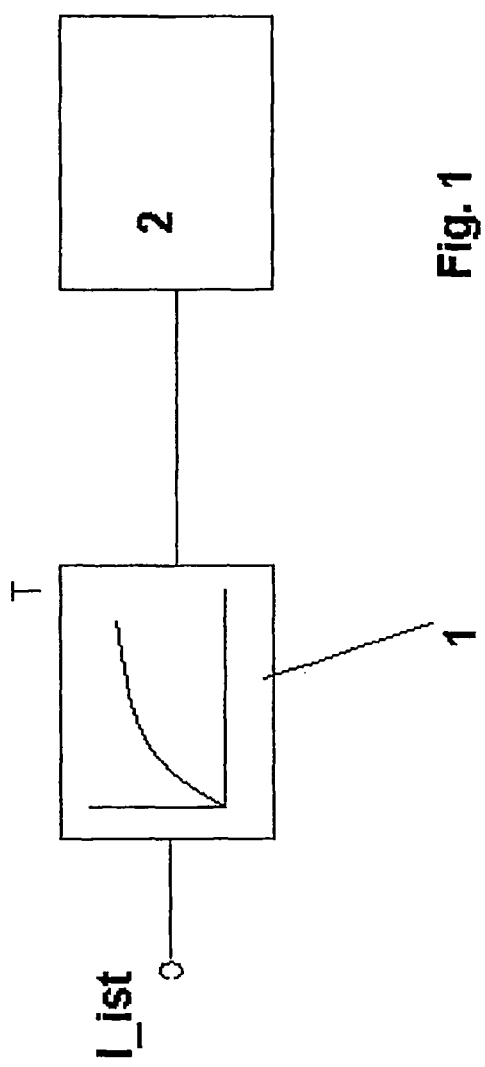
FIG. 1 illustrates a conventional filter.
Figure 2:
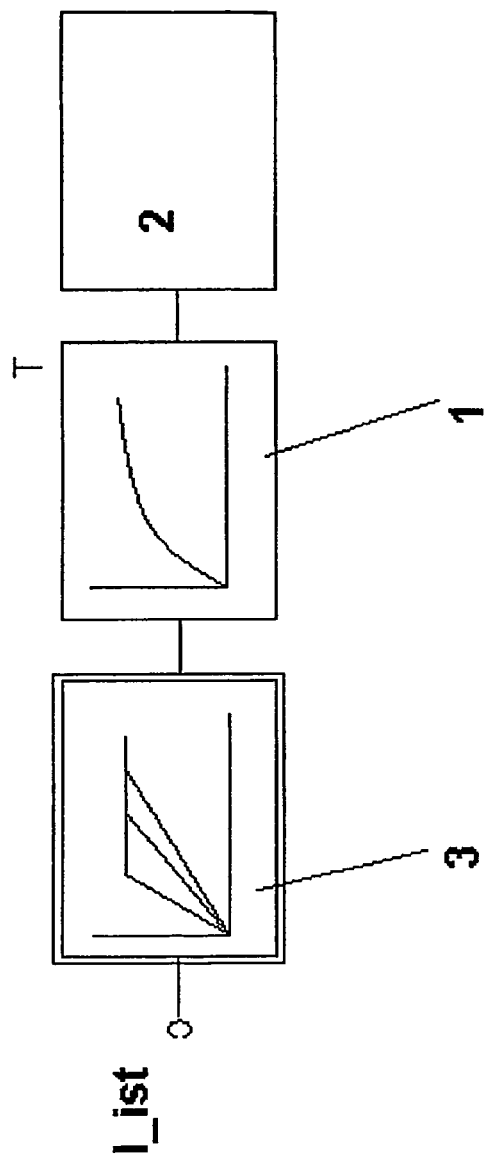
FIG. 2 illustrates an example embodiment of the present invention.

Certain features of example embodiments of the present invention are illustrated in FIG. 2. A run-up transmitter 3 is connected in outgoing circuit to the current-sensing device. The output signal of the run-up transmitter is subjected to the usual filtering, i.e., fed to low-pass filter 1, and the signals filtered in this manner are then fed to the microcontroller.

In an ideal case, the run-up transmitter has the characteristic that its output signal increases at a fixed rate of change, as long as the output voltage is less than the input voltage. In a similar manner, its output signal decreases at a fixed rate of change, as long as the output voltage is greater than the input voltage. Therefore, when the input signal changes more slowly than what corresponds to these two rates of change, then the output signal is equal to the input signal. Deviations from this ideal behavior may occur in practice.

Figure 3:
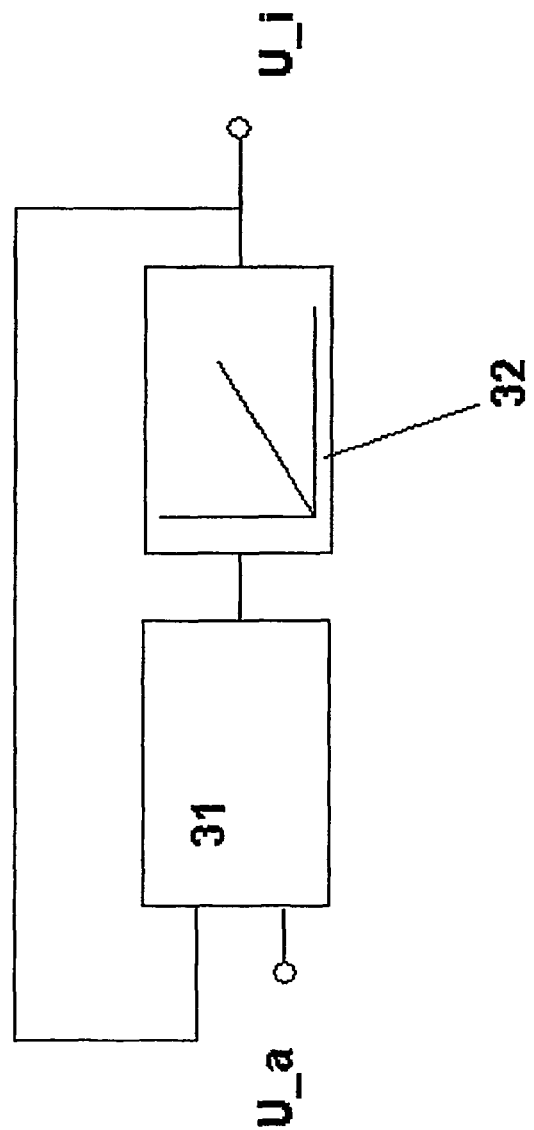
FIG. 3 illustrates an example embodiment of the present invention.

A basic arrangement of the run-up transmitter is illustrated in FIG. 3. In this context, the output of a comparator 31 is fed to an integrator 32, and the output signal of integrator 32 is used by comparator 31. Therefore, as long as there is a difference between the input and output variables of the run-up transmitter illustrated FIG. 3, the output of comparator 31 will have a positive or negative value as a function of the algebraic sign of the difference. The output signal of integrator 32 increases linearly with time or decreases linearly with time. All in all, a short-term, rectangular input variable is converted into a small triangular pulse. The slope of the triangular waveform is a function of the time constant of the integrator. In example embodiments of the present invention, this is selected to be greater than the typical duration of the recharging-current peak for the charging of the cable capacitances.

The maximum slope of the output signal of the run-up transmitter is selected so that its magnitude is greater than the maximum slopes of the motor-current characteristic. These slopes of the motor-current characteristic are substantially determined by the inductance of the electric motor and the applied voltage and the induced voltage in the motor. Therefore, the motor currents are not low-pass filtered, but the current characteristic to be measured is passed through the subsequent circuit elements substantially unchanged. However, the recharging-current peaks are sharply reduced, because they have a considerably greater slope than the mentioned, maximum voltage of the output signal of the run-up transmitter.

Figure 4:
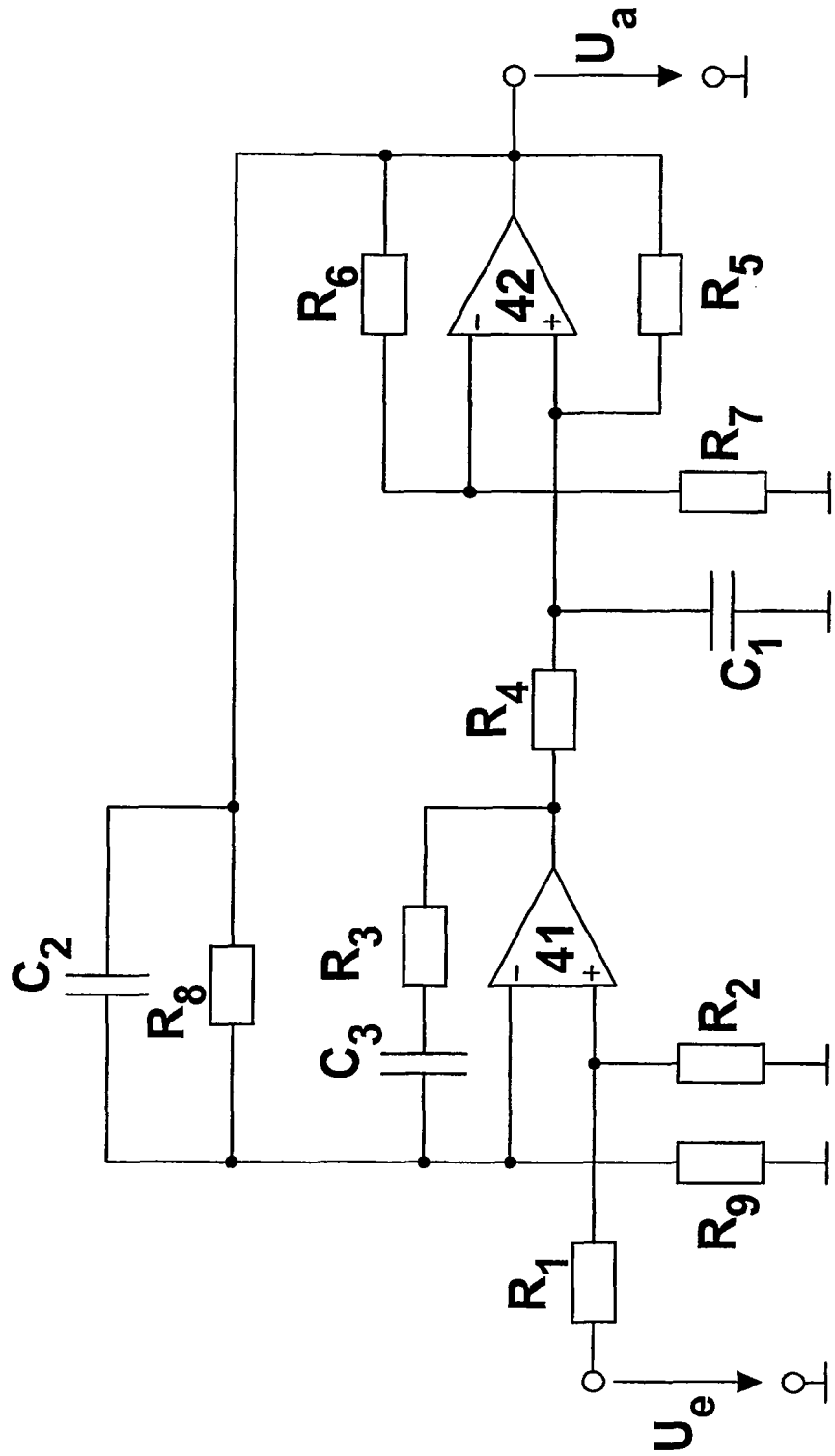
FIG. 4 is a circuit layout diagram.

An example of a circuit layout is illustrated in FIG. 4. However, other circuit layouts may also be used. In FIG. 4, the comparator is implemented with the aid of operational amplifier 41, as well as the surrounding circuit elements. Its output signals are fed to integrator 32, R4, R5, R6, R7, and C1 with level conversion, this integrator having a time constant between, e.g., 2 and 10 µs, and operational amplifier 42 being provided to be used for level conversion. The output signal is fed back to the input of the comparator via resistor R8. Capacitor C2 is used to prevent the set-up from oscillating. Further components are also provided and dimensioned for preventing oscillation, such as C3. The comparator is implemented as an amplifier having a high gain, which is determined by R1, R9, R2, and R8.

Figure 5:
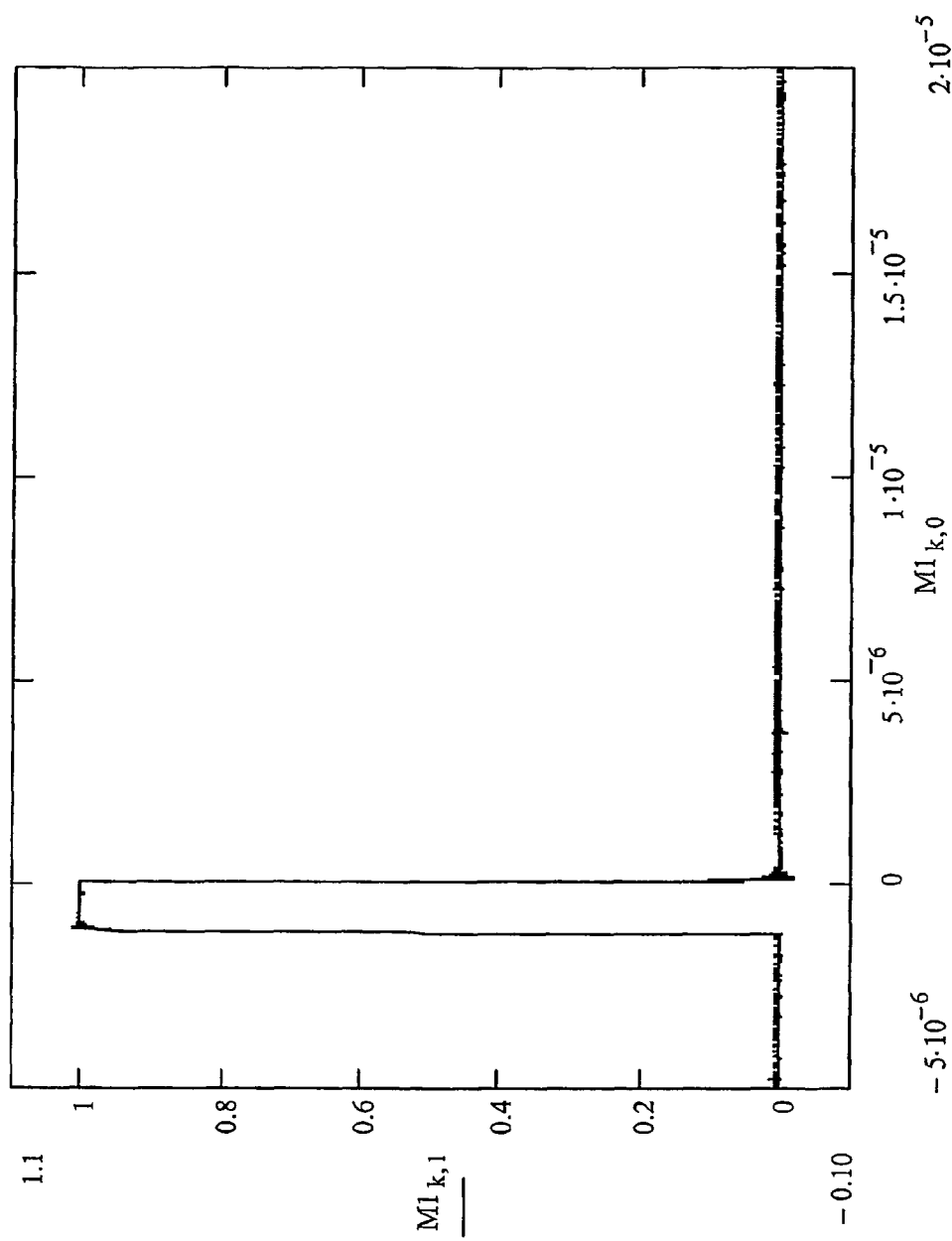
FIG. 5 illustrates a pulse.

Illustrated in FIG. 5 is an example of a pulse, which schematically illustrates the time characteristic of a recharging-current peak normalized to 1, the recharging-current peak having a pulse width of somewhat greater than 1 µs. In the case of shielded cables several meters long, for example 20 m, recharging-current peaks may exhibit peak values of several ampere, for example 10 ampere and greater. The real time characteristics are not rectangular pulses as illustrated in FIG. 5, but have a sharply damped oscillatory characteristic, which is also determined by the inductance of the cable and by other variables. However, the symbolic shape of the recharging-current peak is used for more effectively understanding example embodiments of the present invention and the behavior of the run-up transmitter in comparison with conventional arrangements. The voltage-time area of the represented, symbolic recharging-current peak is comparable to recharging-current peaks.

Figure 6:
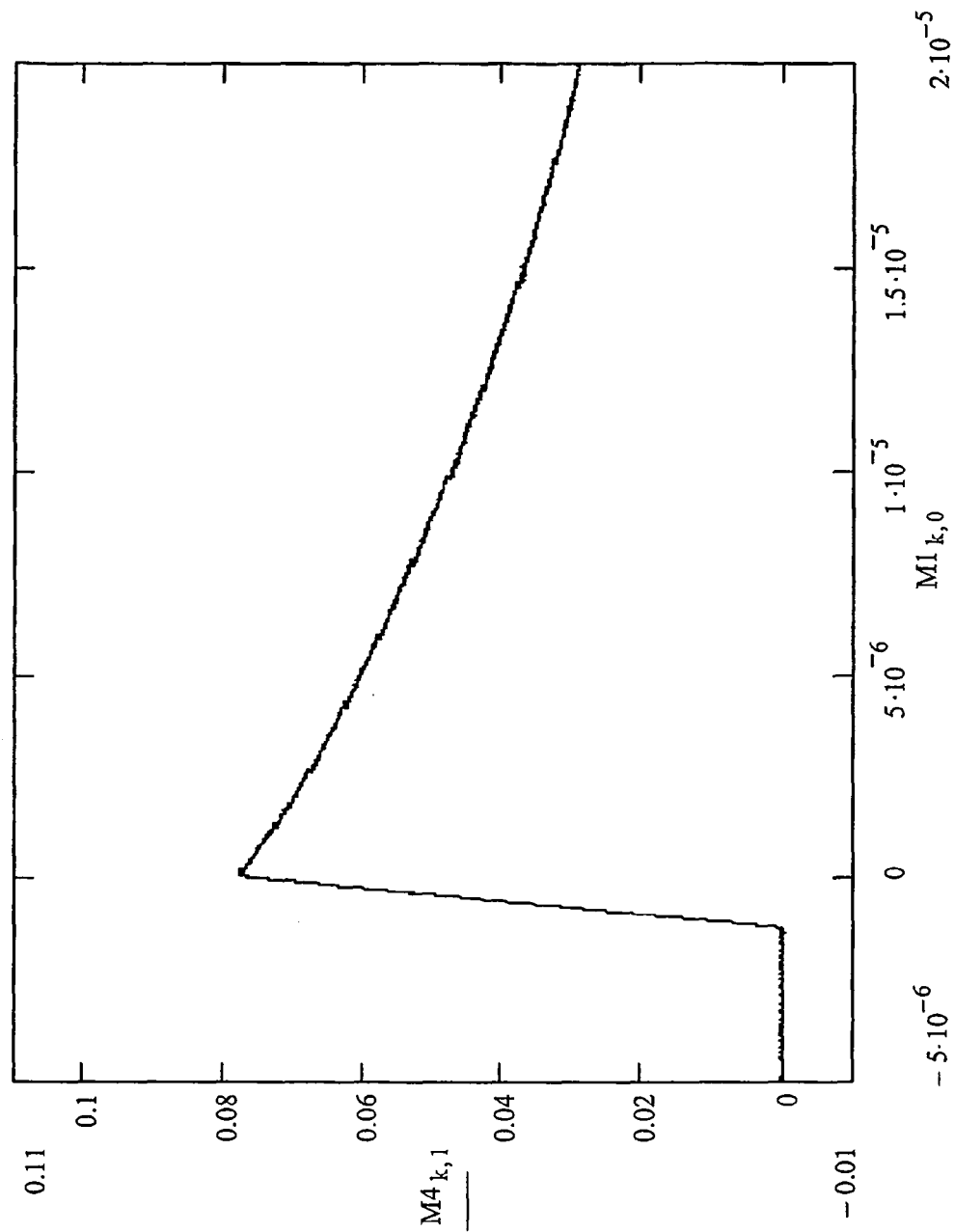
FIG. 6 illustrates a response of a conventional PT1 filter.

FIG. 6 illustrates the response of a conventional PT1 filter having a time constant of 20 µs, to the recharging-current peak illustrated in FIG. 5. This corresponds to conventional arrangements. The filtered value reaches a magnitude of 0.08, i.e., 8% of the recharging-current peak. The discharging time of the PT1 filter is very long. The voltage-time area is very large as well.

Figure 7:
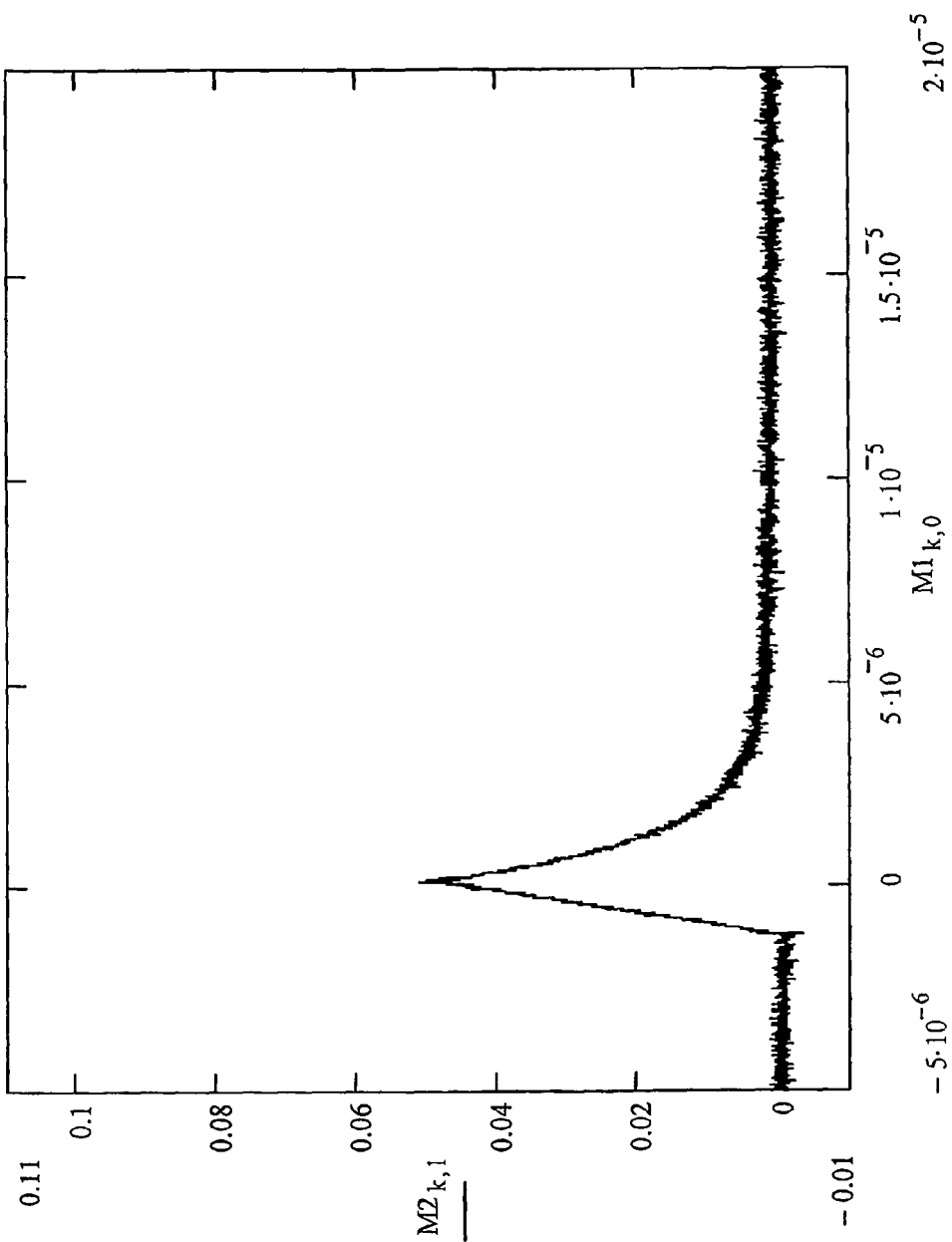
FIG. 7 illustrates a response of a run-up transmitter.

FIG. 7 illustrates the response of the run-up transmitter to the recharging-current peak illustrated in FIG. 5. The peak value reaches a magnitude of 0.05, i.e., only 5% of the recharging-current peak. The discharging time of the run-up transmitter is very short and is approximately, e.g., 2 µs. The voltage-time area is very small as well. Deviations from an ideal triangular shape of the response result from the fact that the comparator does not have an infinitely high amplification, but only a finite amplification for suppressing oscillatory behavior.

Operational amplifier 41 may be selected to from saturation into the active control range within less than, e.g., 200 ns.

Figure 8:
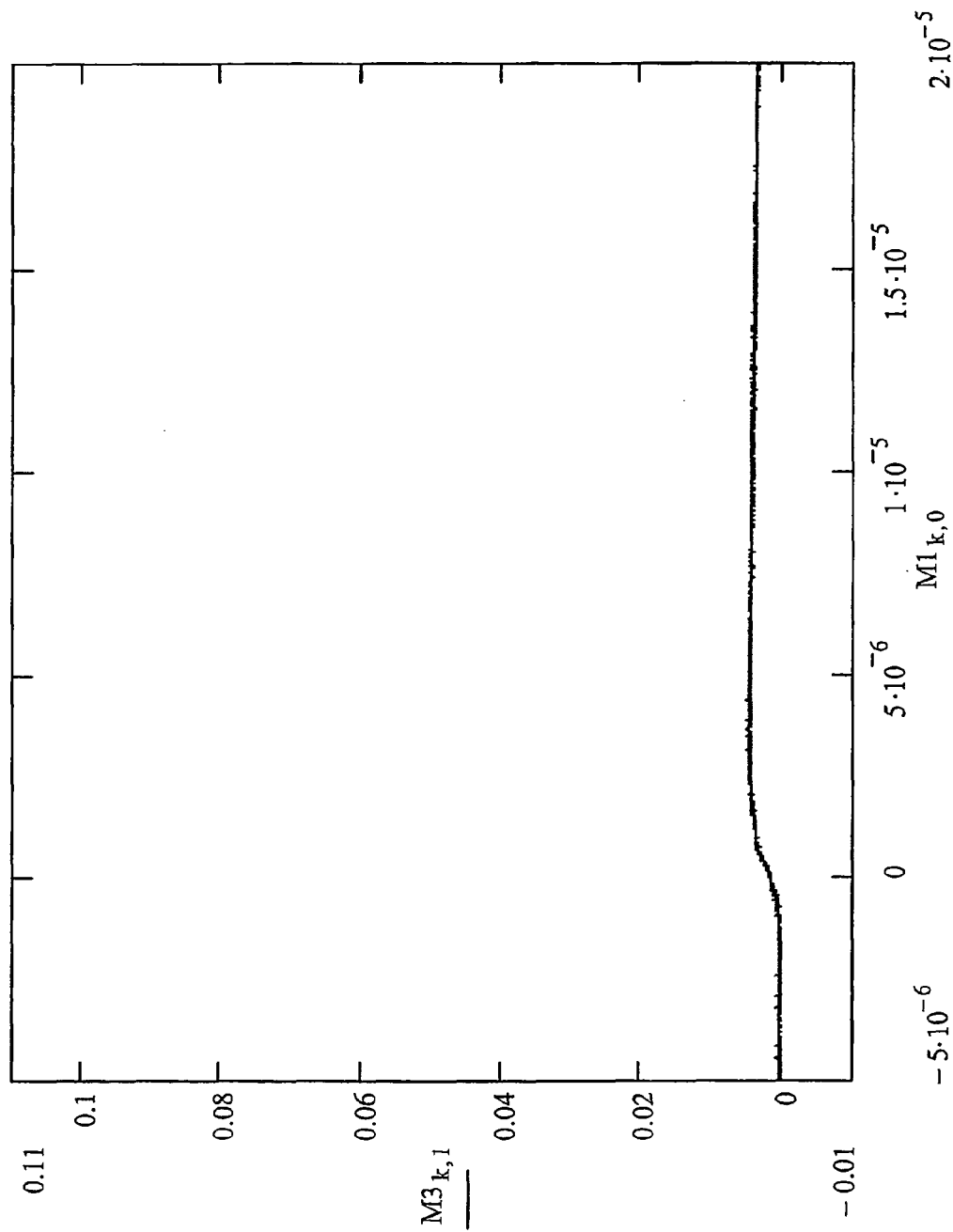
FIG. 8 illustrates a response of a filter connected to a run-up transmitter.

FIG. 8 illustrates the response, when conventional filter 1 is connected in outgoing circuit to run-up transmitter 3. It is illustrated that the recharging-current peak has only a very small effect on the output signal fed to microcontroller 2.

Therefore, example embodiments of the present invention may provide a nonlinear filter, which may suppress recharging-current peaks in a highly effective manner and, consequently, also may allow a very high control quality in the case of converters having long cables leading to the powered motor.

What is claimed is:

1. A converter, comprising:
    a device adapted to sense currents fed to an electric motor powered by the converter, the device arranged inside the converter,
    wherein signals of the device are fed to a nonlinear filter and output signals of the nonlinear filter are fed to an additional filter that is connected to an analog-to-digital converter; and
    wherein maximum slopes of the output signals of the nonlinear filter are configured to have magnitudes greater than maximum slopes of a motor-current characteristic of the electric motor.

2. The converter according to claim 1, wherein the analog-to-digital converter is integrated in one of (a) a microcontroller and (b) a microprocessor.

3. The converter according to claim 1, wherein the nonlinear filter includes a run-up transmitter.

4. The converter according to claim 3, wherein the run-up transmitter includes a comparator and an integrator.

5. The converter according to claim 3, wherein a value corresponding to a rated current of the converter is attainable for the run-up transmitter in a time between 5 and 10 µs.

6. The converter according to claim 1, wherein the additional filter includes a PT1 filter.

7. The converter according to claim 6, wherein the PT1 filter has a time constant having a value one of (a) between 15 and 25 µs and (b) approximately 20 µs.

* * * * *